United States Patent [19]
Voll et al.

[11] Patent Number: 4,586,489
[45] Date of Patent: May 6, 1986

[54] SEMI-CONCENTRATING SOLAR ENERGY COLLECTOR

[75] Inventors: Gerhard W. Voll, Mounds View, Minn.; Richard L. Weiher, Hudson Township, St. Croix County, Wis.

[73] Assignee: Minnesota Mining and Manufacturing Company, St. Paul, Minn.

[21] Appl. No.: 684,451

[22] Filed: Dec. 21, 1984

[51] Int. Cl.$^4$ .................................................. F24J 2/10
[52] U.S. Cl. .................................................... 126/438
[58] Field of Search ................................. 126/438, 439

[56] References Cited

U.S. PATENT DOCUMENTS

| | | |
|---|---|---|
| 1,575,309 | 3/1976 | Anderson . |
| 3,125,091 | 3/1964 | Sleeper ................................. 126/438 |
| 3,939,818 | 2/1976 | Hamilton et al. . |
| 4,056,094 | 11/1977 | Rosenberg . |
| 4,074,678 | 2/1978 | Posnansky . |
| 4,076,015 | 2/1978 | Mattson ................................ 126/439 |
| 4,148,563 | 4/1979 | Herbert . |
| 4,167,934 | 9/1979 | Miles . |
| 4,261,331 | 4/1981 | Stephens . |
| 4,270,517 | 6/1981 | Stephens . |
| 4,349,013 | 9/1982 | Uroshevich . |

OTHER PUBLICATIONS

"Principles of Solar Concentrators of a Novel Design" From Solar Energy, vol. 16, pp. 89–95. Author: Roland Winston.

Primary Examiner—Carrol B. Dority, Jr.
Attorney, Agent, or Firm—Donald M. Sell; James A. Smith; John C. Barnes

[57] ABSTRACT

A solar collector of the non-tracking fluid circulating type which is formed of light weight materials and comprises a frame supporting fluid circulating tubes having a light absorber disposed axially therein and lined with retroreflective cube-corners. The tubes are placed in semicircular reflectors and enclosed by a transparent barrier sheet and cover having light anti-reflective coatings.

13 Claims, 5 Drawing Figures

SEMI-CONCENTRATING SOLAR ENERGY COLLECTOR

BACKGROUND OF THE INVENTION

1. Field of the Invention

This invention relates to solar energy collectors, and in one aspect, to an improved solar energy collector which is plastic, lightweight, semi-concentrating, non-tracking and of the fluid circulating type for use in various heating applications.

2. Description of the Prior Art

Fluid circulating solar heating systems utilize a collector for changing the sun's energy to heat, a heat exchanger for transferring the heat energy to a circulating medium via connecting pipes, manifolds, circulating pumps, and the associated controls for such systems. A desirable feature for a solar energy collector is an efficient absorber of the solar energy. One such absorber is a dark vaned absorber disposed in a fluid circulating tube such that as the sun's energy is changed to heat, energy on the absorber the circulating fluid will absorb the heat. Because of the use of plastic, however, it is necessary, in the event of power failure or when the system is allowed to drain down, that the absorber will not become too hot and melt the tube. Further, to avoid the necessity of tracking, the reflectors around the absorber are not parabolic reflectors having a focus, and the design of the system should be such that ambient heat around the absorbers cannot be easily lost by convective currents.

A typical heating element for solar energy is described in U.S. Pat. No. 1,575,309, issued to W. A. Anderson, Mar. 2, 1926. This patent discloses a solar heating element using a parabolic reflector, in the center of which was mounted a light absorbing heating member 21 positioned to absorb the sun's rays striking the reflector. The heating member 21 was placed in a transparent tube through which water could be circulated, resulting in the heating of the water by the heating member. A system of this nature would necessarily have to be supported to track the movement of the sun to be efficient more than a limited period each day.

Another similar patent teaching the use of an absorber within a transparent tube positioned at the focus of a reflector is U.S. Pat. No. 4,074,678, issued Feb. 21, 1978, to M. Posnansky.

The present invention utilizes a generally semi-cylindrical reflector positioned about each of a plurality of clear plastic tubes for the heat transfer medium. Such semi-cylindrical reflectors do not focus light striking the reflector to a predetermined point and thus tracking is unnecessary.

Another important part of an efficient, all plastic collector is the protection of the components from exceedingly high temperatures. This is necessary particularly if there is a power failure or the system is drained for other reasons. Protection of this sort is accomplished by the use of a light blocking system or light valve which has the effect of stopping the sunlight from reaching the absorber during such periods to avoid high "stagnation" temperatures. Prior art related to such "light valves" for solar collectors include U.S. Pat. No. 4,261,331, issued Apr. 14, 1981, to R. B. Stevens. This patent discloses a heat-sensitive optical switch which is operative when the temperature of the heat transfer fluid gets above a predetermined value. A precipitate forms in the fluid, causing a light scattering layer to appear between the sun and the absorber. U.S. Pat. No. 4,148,563, issued Apr. 10, 1979, to E. Herbert discloses two mating collector elements utilizing V-shaped ridges with a 90 degree included angle. When a film of liquid is disposed between the mating surfaces with the V-shaped ridges, light is allowed to pass and heat up the liquid, but when the liquid reaches a certain temperature the liquid vaporizes, causing the incoming light to be reflected by the V-shaped ridges or prisms. Another piece of prior art which is specifically related to the "light valve" is U.S. Pat. No. 4,056,094, issued Nov. 1, 1977, to P. Rosenberg. This patent shows a valve for a flat plate collector utilizing rows of V-shaped ridges on the light transmitting panel which is spaced from the absorber plate and through which space the heat transfer fluid is caused to flow. When the fluid is in the space the light is transmitted and when the fluid is drained away, the V-shaped ridges cause total internal reflection of the light so it is not allowed to pass through the transmitting panel to the absorber. The use of linear V-shaped ridges or prisms with the facets at 45° with the top surface require frequent adjustment of a flat plate solar collector throughout the year, see Column 8, lines 28 to 48.

The present invention overcomes the deficiencies of the prior art and provides a highly efficient solar energy collector which has a unique automatic shutdown or light valve system to eliminate high stagnation temperatures, and one which is designed such that no tracking or adjustment or alignment with the sun is necessary to obtain its near maximum efficiency and utilize its protective features. The collector is usable with fluid circulating systems and is particularly compatible with "drain-back" hot water systems.

SUMMARY OF THE INVENTION

This invention relates to a solar collector comprising an insulative frame member enclosing a plurality of transparent tubes for circulating the heat transfer fluid, an efficient solar energy absorber disposed in the tubes, a long reflector of generally semi-circular cross section surrounding each of the tubes, a light transmissive covering over the reflectors to maintain the heat energy adjacent the tubes and free from loss due to ambient convective currents, and an outer protective skin of transparent material.

The transparent tubes have an internal covering containing cube corner prisms affording total internal reflection in the areas of each of the cube corner prisms to block light passing through the tubes from reaching the absorber disposed centrally with respect to the tubes when the heat transmitting fluid is drained from the tubes.

The frame of the solar energy collector of the present invention is a large trough formed of insulative styrene or similar light-weight material within which is a plurality of parallel extending reflectors and clear transparent fluid circulating tubes preferably of plastic. It is recognized that the frame may be made of a variety of other insulative materials, e.g., wood.

The barrier over the reflectors is preferably a sheet of material having anti-reflective surfaces permitting the solar energy to readily pass through the sheet. The outer protective layer is formed preferably of a light-transmissive polymeric material which has sufficient strength to protect the solar collectors and not become readily damaged or scratched by the normal environmental elements, preferably having antireflecting surfaces.

BRIEF DESCRIPTION OF THE DRAWINGS

The present invention will be described in greater detail with reference to the accompanying drawing wherein.

DESCRIPTION OF THE PREFERRED EMBODIMENTS

Figure 4:
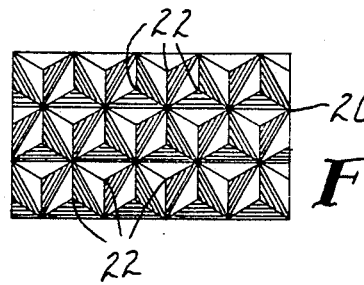
FIG. 4 is an enlarged planar view of the array of cube corners lining the inner surfaces of the heat transfer fluid circulating tubes.
Figure 1:
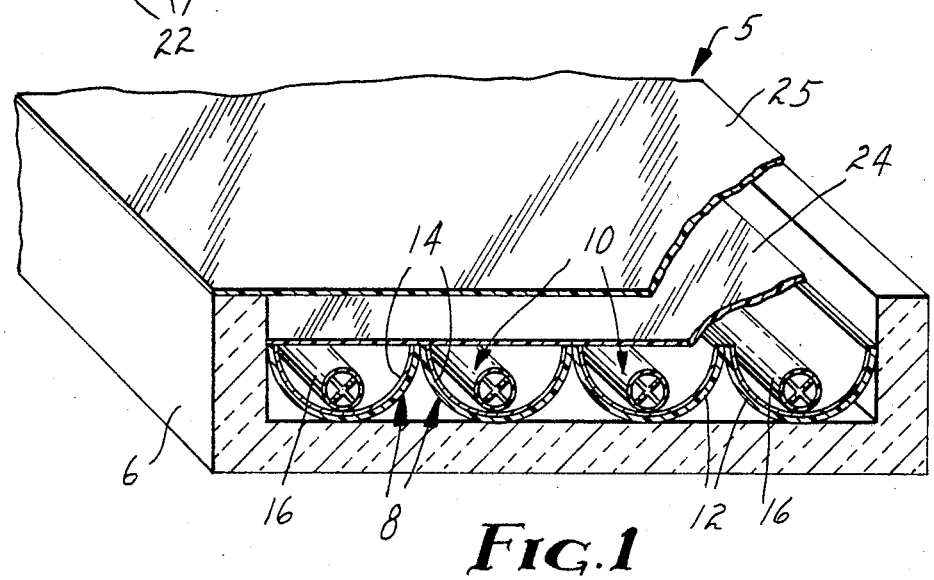
FIG. 1 is a fragmentary perspective and vertical sectional view of the solar collector constructed in accordance with the present invention.

Referring now to FIG. 1 there is disclosed a cross sectional view of the flat plate solar collector designed according to the present invention to afford an all plastic, highly efficient and light weight semi-concentrating, nontracking, fluid circulating type solar collector constructed with an automatic protective device to avoid destruction resulting from high "stagnation" temperatures occuring during electrical power failures or other periods when the system has been drained.

The collector, generally designated by the reference numeral 5, has as one of its best applications the solar heating of hot water for domestic use because it is useful year around, and the consumption matches well with the availability of solar energy and has a weight, size and cost which are not prohibitive. In so-called "drain-back" systems for circulation of water for hot water heating there is the advantage of not needing any freeze protection for the heat transfer medium and only a single wall heat exchanger is needed. The collector need not be pressurized. In these systems the fluid drains back from the collector to a reservoir when the circulating pump stops.

The present commercially available flat plate solar energy collectors with a high performance rating are generally very costly and heavy. Most such systems are constructed from high temperature materials such as metals and low iron tempered glass. Their flat energy absorber plates are difficult to construct. The use of plastics in solar collectors has merit from the standpoint of potentially lower cost and weight and greater impact resistance than glass. Presently available pigment-filled plastic panels utilized as absorber plates for solar collection and defining the fluid circulating paths between sealed panels have a shorter life span and do not withstand weathering to the extent that the higher performance metal absorbing panels have.

The solar collector of the present invention comprises some features of the sophisticated systems but is light weight, low cost and long lifed. The present system comprises a frame member 6 of trough shape which thus has a recessed area in which is placed a plurality of semi-cylindrical parallel reflectors 8, each of which surround a clear plastic tube 10.

The reflectors 8 each comprise a plastic semi-cylindrical member 12 having a thin reflective layer 14 laminated or coated on the inner surface of the semi-cylindrical member. The reflectors 8 are disposed in parallel relationship with the open side of each reflector disposed in a common plane and fitted against the adjacent reflector 8.

Figure 2:
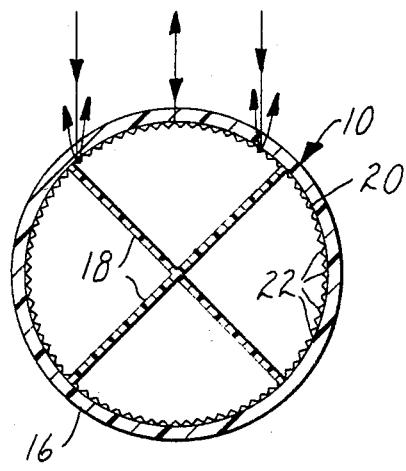
FIG. 2 is a vertical sectional view of the heat transfer fluid circulating tubes of the solar collector when it is drained of the heat transfer fluid.
Figure 3:
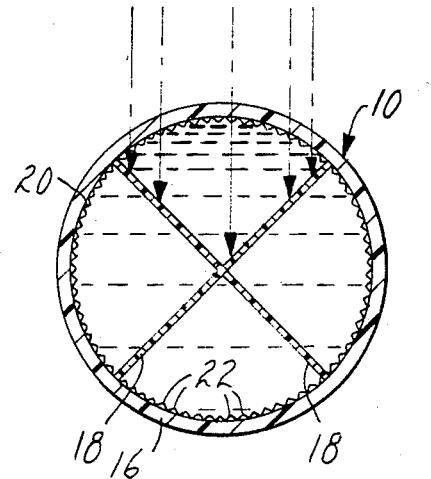
FIG. 3 is a vertical cross sectional view of the heat transfer fluid circulating tubes of the solar collector with the heat transfer fluid disposed in the tube.

Each of the plurality of heat transfer tubes 10 are illustrated in greater detail in FIGS. 2 and 3, and comprise clear plastic cylindrical tubes 16 in which is disposed a solar energy absorber 18 made of high temperature black plastic material such as pigmented polyaryl sulfone or polyetherimide and having four radially directed vanes. The absorber is inserted into the tube generally coaxially thereto. The energy absorber 18 will be the hottest element in the solar collector, and the heat resulting from the absorption of the sun's energy on the absorber 18 will be transferred to the heat transfer fluid which would preferably be water or other transparent transfer liquid. The collection efficiency of the illustrated structure is improved over conventional tube absorbers where the energy is absorbed at the surface of the black tube or near the surface for black liquids.

As illustrated and preferred, the perimeter of the solar absorbing member 18 is four times the diameter of the tube 16. This is efficient because a one inch (2.54 cm) diameter tube will have four inches (10.2 cm) of absorber surface exposed to the heat-scrubbing circulating water for excellent heat transfer between the two. The absorber illustrated is formed of four strips joined to form the X or cross shape illustrated. The area of this heat transfer surface is about the same as the effective aperture area of the reflector 8.

Laminated also to the inner surface of the tube 16 is a very thin sheet 20 of film material having on the internally exposed surface thereof a plurality of closely packed cube corner prisms 22 affording retro-reflection by internal reflection of light striking said cube corner when the index of refraction between said prisms and the interior of the tube 16 is high. This difference in the index of refraction between the film material and air affords internal reflection and retro-reflection of the solar rays when the water is drained from the tube 16 exposing the prisms to the air in the tube. Since the prisms have a low mismatch of refractive index with water, the light can penetrate the tube 16 and the sheet 20 having the retro-reflective prisms to effectively strike the absorber 18 to absorb the heat energy from the sun. With no water in the tube, as is the case when the circulating pump is off in a "drain-back" system, the collector tube appears white and the black solar absorber 18 is not seen as the solar energy is reflected.

The heat transfer fluid tubes can alternatively be formed by rolling sheets of transparent material formed with a cube-corner surface on one face and sealing the abutting edge to form a tube or molding the tubes with an array of nested cube-corners on the inner surface.

Forming a thermal barrier across the upper surfaces of the reflectors 8 is a sheet 24 of transparent polymeric material preferably having disposed on the surfaces thereof an anti-reflective coating.

Extending over and spaced from the thermal barrier sheet 24 is a cover sheet 25 of light-transmissive material which affords the protective covering for the solar energy collector. An example of such protective covering 25 is $\frac{1}{8}$ inch (3.2 mm) "Plexiglas" placed 1 to 1 and one quarter inch (25.4 to 31.7 mm) from the barrier sheet 24. Cover sheet 25 preferably has an anti-reflective coating on both surfaces.

The solar collector of the present invention is a low concentrating one-dimensional, or "line", concentrator. The plane, or face, of the collector faces south and is tilted from the horizontal by an angle equal to the local latitude. The axis of the individual tubes is horizontal in an east-to-west line which gives effective concentration for various azimuth angles between the plane of the collector and the hourly positions of the sun as the earth rotates. This effectively eliminates daily east-to-west tracking.

Normally, line concentrators when positioned as above need to be frequently readjusted in a north-south direction to compensate for the seasonal variations in the solar declination ($\pm 23.5°$). It was found experimentally that for the described geometry, the north-south incidence angle could exceed the variations in the solar declination if the concentration ratio was kept to 4:1 or lower.

Other shapes than semi-circular shapes as concentrating troughs can be used. The position of the fluid circulating tubes near the bottom center of the light concentrating troughs simplifies the production process of the units. Other trough geometries may require a different spacing between the concentrating trough and the fluid carrying tube.

The following is a discussion of collectors 5 formed according to the present invention and successfully tested.

EXAMPLE 1

As a test of the light valve concept, a 1 ft.×4 ft. (30 cm by 121.9 cm) collector with an energy concentration of about 3.5 X was constructed. In place of the semi-cylindrical reflectors, 3 inch (7.6 cm) diameter tubes were made of polycarbonate plastic with the lower half of the tubes reflectorized with aluminum coated polyethyleneterephthalate film. The inner one inch (2.54 cm) diameter fluid circulating tubes 10 were made of polycarbonate plastic and placed in the lower portion of tubes. The solar absorber 18 was made from 0.5 inch (1.27 cm) strips of black polyvinyl chloride. The solar reflecting film 24 was made of ECP 91 film from Minnesota Mining and Manufacturing Company, St. Paul, MN 55144. The light valve material 20 was acrylic film formed with retro-reflecting cube-corner prisms on one surface, also from Minnesota Mining and Manufacturing Company, St. Paul, MN 55144, which was rolled into tubular shape to fit the inside surface of tube 10. With water in the tubes, the total internal reflection of the sheeting 20 was destroyed, the fluid circulating tube 10 became highly transparent, and the effective collector area of about 4 square feet (0.37 square meters), appeared very black. This indicated that tube 10 was light transmitting. When the water was drained from the tube, as in the case when the fluid circulating pump in a solar energy collecting drain-back system malfunctions, the effective area became silvery white or a little off-white.

Stagnation tests then were conducted outdoors on the drained collector with the tubes horizontal and the plane of the collector near normal to the sun at noon. The collector tilt was 45°. The small plastic tubes 10 were in a drained condition, as seen in FIG. 2. A thermocouple was placed near the center of the X-shaped light absorber channel. Another thermocouple was placed at the inner surface of the film 20, which was located near the center of the effective energy collecting area. The thermocouples were type E, chromel-constantan and connected to a thermocouple switch Model 101 by Love Controls Corporation of 1475 South Wheeling Rd., Wheeling, IL 60090 and a Keithley Model 177 Digital Voltmeter by Keithley Instruments, 28775 Aurora road, Cleveland, Ohio 44139, was used to read the output voltage. This voltage was then converted to temperature units.

The stagnation temperature of the X-shaped solar absorber 18 was recorded as 196° F. (91° C.) at noon and increased to 248° F. (120° C.) as the azimuth angle increased in the afternoon. This temperature increase in the afternoon is expected because the sheeting 20 is less reflecting for off-normal light rays. There was no damage to the polycarbonate tubes and only slight deformation of the surfaces of the acrylic sheeting 20. Without the light valve material, the complete collector would have been destroyed by a stagnation temperature which theoretically could have exceeded the melting point of the plastic materials for this geometry and concentration.

No collector efficiencies were measured for this example.

EXAMPLE 2

A collector was constructed as in Example 1 with the exception that the sheeting 20 was made of polycarbonate plastic. The light valve concept was again demonstrated and stagnation temperature tests were performed.

At near normal light incidence (solar noon), the recorded stagnation temperature near the center of absorber 18 with the tubes drained was 220° F. (104.4° C.) and at the inner surface of the sheeting 20 it was 190° F. (87.7° C.). Solar insolation was 313 BTU/(h-ft$^2$). The ambient temperature was 76° F. (24.4° C). With the increasing azimuthal angle during the afternoon, the stagnation temperature at the absorber 18 increased to a maximum of 239° F. (115° C.), and at the inner face of sheeting 20, to 199° F. (92.78° C.).

With the water circulating through the small plastic tubes 10, as seen in FIG. 2, the appearance of the total effective energy collecting area became dark, indicating an effective light valve and good light concentration.

Collector efficiency measurements were conducted on this collector as per ASHRAE Std. 93-77 with one modification. Since the collector was an experimental model its total surface area was much larger than the net collection area. Efficiency calculations were done using the net collection area instead of gross area as required by ASHRAE Std. 93-77.

Solar insolation was measured with an Eppley Radiometer, Model PSP, from Eppley Laboratories, Inc., Newport, R.I. 02840. Water inlet and outlet temperatures were measured with thermocouples as described for the stagnation temperature measurements. The water flow rate through the collector was fairly low and standard flow meters are inaccurate at low flows. Flow rate was measured by timing with a stop watch a certain water volume through the collector. Efficiency measurements were performed outdoors.

Figure 5:
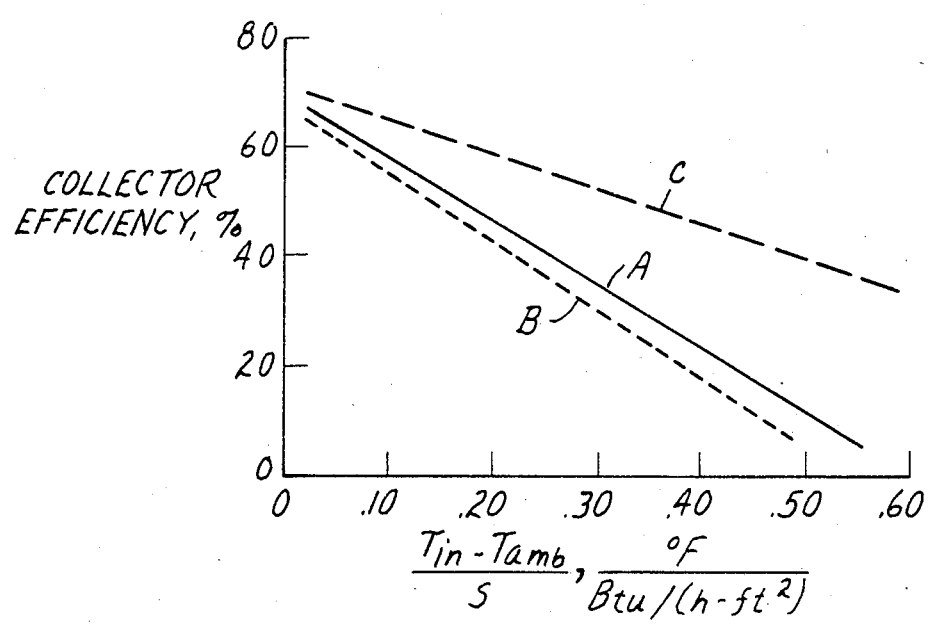
FIG. 5 is a performance graph comprising performance of collectors of the present invention with a published performance curve.

The performance results are seen in FIG. 5 below. The solid line A is a performance curve of a typical flat-plate liquid-heating collector with dual glazing, as published by National Bureau of Standards, Technical Note 899. This curve is used as a comparison to the performance of the collector of the example, which could be classified as a single glazed collector.

The dash line B of FIG. 5 is a best fit line for the collector of this example 2. Note it is nearly as efficient as the NBS published dual glazed collector.

In FIG. 5, $T_{in}$ is the temperature of the heat transfer fluid entering the tubes, $T_{amb}$ is the ambient air temperature and S is the solar insolation. The conversion factor is 0.1° F./(Btu/h-ft$^2$) equals 0.01761° C./(w/m$^2$).

EXAMPLE 3

For a reduction of heat losses, a dual glazing collector was developed as seen in FIG. 1. The fluid circulating tube 10 containing the light absorber 18 and the light valve sheeting 20 were constructed as in Example 2. The large tubes of Examples 1 and 2 were eliminated and replaced with semi-circular reflectors 8, covered with reflecting film 14 available as ECP-91 by Minnesota Mining and Manufacturing Company of St. Paul, MN 55144. The reflectors 8 with fluid circulating tubes 10 mounted at their bottom as shown were placed in an insulating cavity made from 1 inch (2.54 cm) thick glass fiber and 1 inch (2.54 cm) thick styrofoam. Inner barrier 24, made of "SunGain" brand SG-10 film by Minnesota Mining and Manufacturing Company, St. Paul, MN 55144, was placed immediately over the reflectors and an outer cover 25 of ⅛ inch (3.1 mm) thick "Plexiglas" was used and spaced 1¼ inches (3.17 cm) from the inner cover.

Stagnation temperature tests were run as in Example 1. At near normal light incidence (solar noon), the recorded temperature near the center of the absorber 18 was 229° F. (109° C.) and at the inner surface of sheeting 20 at 204° F. (95.5° C.). Solar insolation was 331 BTU/(h-ft$^2$) (1044 watts/m$^2$). The ambient temperature was 60° F. (15° C.). With the increasing azimuthal angle during the afternoon, the temperature at the absorber increased to a maximum of 278° F. (136.6° C.) and at the inner face of sheeting 20 to 245° F. (118.3° C.).

Collector efficiency measurements were conducted as in Example 2. The results are shown in FIG. 5 as the broken line C. Again, this is a best fit curve for many measurements. Note the superior performance of this dual glazed collector as compared to the NBS published collector.

Having thus described the present invention with reference to a preferred embodiment and an earlier similar embodiment, what is claimed and protected is defined by the appended claims:

1. A solar collector comprising a plurality of generally semicylindrical reflectors disposed in parallel relationship with the open sides of said reflectors disposed in a plane, a transparent hollow tube disposed within each reflector and adapted to carry a liquid from one end toward the other, said tubes having on the interior surface thereof an array of nested cube-corners, and absorber means disposed in said tube to absorb sun energy efficiently to heat the surface thereof, said transparent tube interior surface defined by cube-corners having an index of refraction substantially different from that of air.

2. A solar collector as defined in claim 1 wherein a light-transmitting thermal barrier sheet is disposed over said reflectors in the plane of said open sides.

3. A solar collector according to claim 2 wherein said thermal barrier sheet has an anti-reflective surface opposite said reflectors.

4. A solar collector according to claim 2 wherein said thermal barrier sheet has an anti-reflection coating on the surfaces thereof.

5. A solar collector according to claim 3 wherein reflectors, tubes and barrier sheet are disposed in a frame having a recess to accommodate the same and a transparent cover is disposed over and parallel to said barrier sheet.

6. A solar collector according to claim 2 wherein said reflectors and tubes are disposed in the cavity of a trough-like frame.

7. A solar collector according to claim 6 wherein said frame is formed on insulative foam material.

8. A solar collector according to claim 7 wherein a cover sheet of transparent material is placed over the open side of said frame and parallel to said barrier sheet.

9. A solar collector according to claim 8 wherein said cover sheet has an anti-reflection coating on one surface thereof.

10. A solar collector according to claim 9 wherein said anti-reflection coating is exposed.

11. A solar collector according to claim 1 wherein each said transparent hollow tube comprises a transparent tube having a sheet of transparent film disposed on the inner surface, said sheet having formed on the exposed surface said array of cube-corners.

12. A solar collector according to claim 1 wherein each said transparent hollow tube is a unitary member with said array of cube-corners on the inner surface and said absorber means comprises a dark cross shaped member disposed axially of said tube.

13. A solar collector according to claim 1 wherein said absorber means comprises a plurality of generally radially directed vanes disposed coaxially of said transparent hollow tubes.

* * * * *